Dec. 6, 1927. 1,652,147

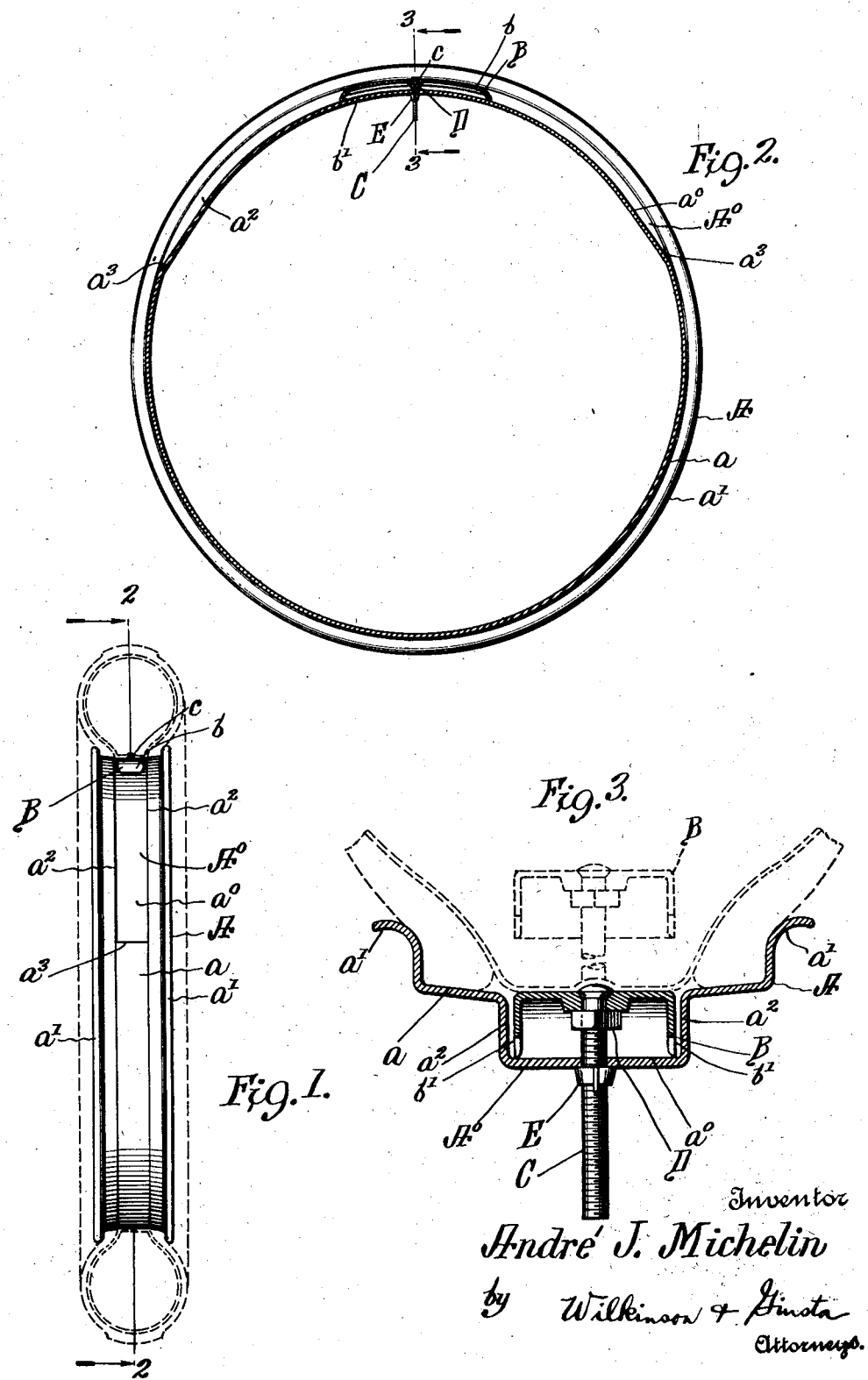

A. J. MICHELIN

DEEP RIM FOR PNEUMATIC TIRES

Original Filed April 10, 1924   2 Sheets-Sheet 2

Inventor
André J. Michelin
by Wilkinson & Fisher
Attorneys.

Patented Dec. 6, 1927.

1,652,147

UNITED STATES PATENT OFFICE.

ANDRÉ JULES MICHELIN, OF PARIS, FRANCE, ASSIGNOR TO MICHELIN ET CIE., OF CLERMONT-FERRAND, FRANCE, A CORPORATION OF FRANCE.

DEEP RIM FOR PNEUMATIC TIRES.

Original application filed April 10, 1924, Serial No. 705,605, and in France January 14, 1924. Divided and this application filed February 18, 1927. Serial No. 169,368.

This invention is a division of my application entitled Improvements in deep rims for pneumatic tires, filed April 10, 1924, Serial No. 705,605, and relates to deep rims for automobile wheels which are provided with pneumatic tires, and has for its principal object to provide a rim of this type which, while retaining all of the advantages inherent thereto as regards the mounting and demounting of the tires, will, at the same time, eliminate the possibility of the beads of the tire entering the deep rim channel should the tire become partially deflated while in use, which condition has heretofore resulted in the tire coming off of the rim entirely, with the consequent disastrous results in numerous instances.

The so-called deep rim for automobile wheels and tires, usually comprises a metallic annulus of substantially channel shape in cross section, the web of which is provided with a medial circumferentially depressed groove into which portions of the beads of the tire may enter when the tire is in its deflated condition, whereby the diametrically opposed portions of the said beads may drop below the flanges of the rim to the end that removal of the tire may be started at such point and carried on at successive points around the rim, without the necessity of providing a separate retaining ring which is detachable from the rim itself.

The beads, under normal operating conditions, are prevented from slipping into the groove by the inflation of the inner tube of the tire, which forces the said beads outwardly against the rim flanges. However, should the tire become partially deflated, ordinarily no provision is made to prevent the beads from slipping into the central circumferential groove with the result that if the vehicle is run with the tires in this condition, they work their beads over the retaining flanges and leave the rims entirely. With the present invention, however, provision is made for preventing the beads from working away from the flanges and into the groove, should the tire become partially deflated, although the means provided may be readily adjusted to permit the said beads to enter portions of the groove for the purpose of removing a tire, when desired.

Reference is had to the accompanying drawings, wherein like reference characters designate like parts through the several views, and in which Figure 1 is an edge view of a rim and safety piece constructed according to my invention, the tire being indicated thereon in dotted lines.

Figure 2 shows a section along the dotted line in Figure 1 and looking in the direction of the arrows.

Figure 3 shows a section along the line 3—3 of Figure 2, the parts being shown on a larger scale and the safety piece being shown in full lines in the safety position, and in dotted lines in the withdrawn position, in which position the adjacent portions of the beads of the tire can be moved down into the groove.

in Figure 5 a slightly modified form of safety piece is shown and this piece is in the safety position.

Figure 5:
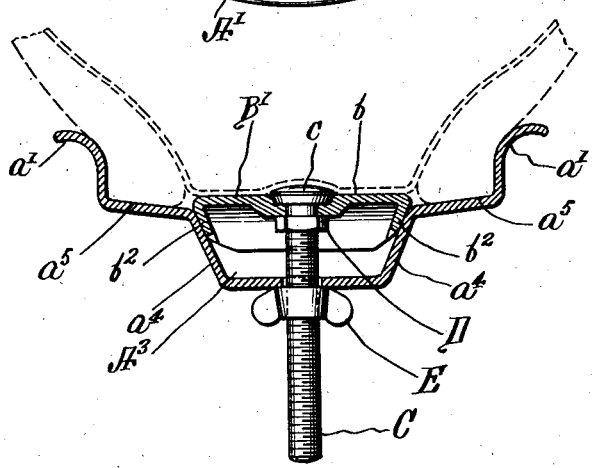
Figure 5 shows a section along the line 5—6 of Figure 4, the parts being on a larger scale and the tire casing and inner tube being shown in dotted lines.
Figure 6:
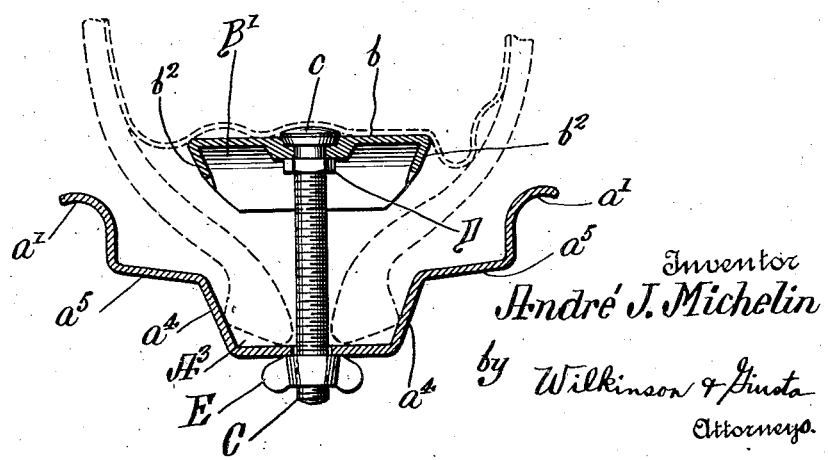
Figure 6 is a similar view to Figure 5, except that the safety piece is in the raised position to enable the beads of the tire to be moved into the grooves for the purpose of either mounting the tire on the rim, or removing the tire from the rim, as will be hereinafter described.

Referring first to Figures 1 to 3, A represents a trough shaped rim having throughout the major portion of its circumference a flat bottom $a$ and curved side flanges $a'$. Throughout less than half of its circumference, preferably from 140 to 160 degrees, this flat bottom $a$ is shaped at its center to form a groove $A^0$, having a flat bottom $a^0$ and side walls $a^2$, which walls may be either vertical, as shown in Figures 1 and 2, or tapered as shown in Figures 5 and 6. This bottom wall $a^0$ of the groove $A^0$ is made integral with the rim and its outer edges $a^3$ merge into the bottom wall $a^0$ to provide a smooth face on which they can engage the inner tube when distended. Mounted approximately midway between the ends $a^3$ of the groove $A^0$ is the safety piece B, which as shown, is in the form of a bent plate, provided with an arcuate upper surface $b$ and inwardly projecting side flanges $b'$. This safety piece is mounted on the screw bolt C, being held between the head $c$ of said bolt and the nut D, so that the said piece may be moved radially in and out with said screw bolt C. This screw bolt is also provided with the wing or other nut E by means of which the bolt C may be clamped at the desired position. This bolt C passes through the perforations in the bottom wall $a^0$ of the groove $A^0$, as shown in Figure 3. Obviously, if desired, the place of the bolt may be taken by the stem of the inner tube of the tire, which stem contains the tire valve and usually projects inwardly through the frame of the wheel. These stems are also usually threaded in substantially the same manner as the bolt C, so that it is only necessary to pass the stem through the aperture in the piece B to tighten up the lock nut against the said piece, whereupon the parts may be employed in exactly the same manner as that above disclosed.

Figure 4:
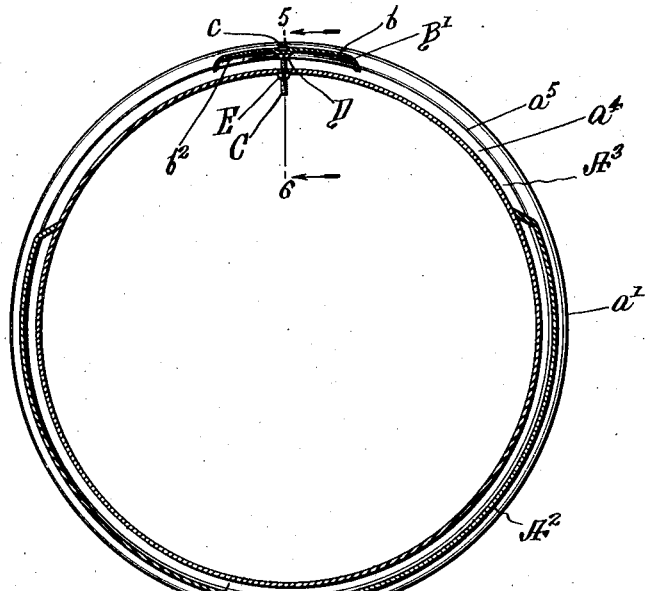
Figure 4 is a similar view to Figure 2, but shows the old form of deep rim provided with a continuous annular groove which is bridged through the major portion of its circumference by a bridge plate.

Referring now to Figure 4, this shows a rim originally provided with a continuous groove $A'$. The groove is bridged, however, through the major portion of its circumference by means of the arcuate bridge plate $A^2$, leaving open a portion only of the original groove, as at $A^3$. The side walls of this groove may be made vertical, as shown in Figure 3, or tapered as shown at $a^4$ in Figures 5 and 6. At the outer ends of these side walls $a^4$ annular shoulders $a^5$ are formed in the rim, adjacent to the curved retaining flanges $a'$, and on these shoulders the beads of the tire rest when the tire is in the inflated position, shown in Figure 5.

The safety piece $B'$ has an arcuate top $b$ and side flanges $b^2$, which flanges are parallel to the side walls $a^4$ of the groove $A^3$.

This safety piece is held between the head $c$ of the screw bolt C and the lock nut D, and the piece and screw bolt may be moved in or out together, both passing through the opening in the bottom wall of the groove $A^3$, as shown in Figures 5 and 6. This bolt is provided with the wing or other nut E, which permits the stem to be drawn inwardly to the safety position, shown in Figure 5, or forced outwardly to the position for releasing the deflated tire, as shown in Figure 6.

In operation, in order to remove the tire, the bolt carrying the safety piece must be forced inwards far enough into the cavity of the tire casing, as shown most clearly in Figure 6, to permit the beads of the tire to be moved down into the groove, at which time the opposite side of the tire may be removed from the rim, and eventually the whole tire removed from the rim and a fresh tire inserted.

In order to assemble the tire with the rim, reverse the operation.

As already stated in connection with Figures 1 to 3, instead of a screw bolt C, the usual valve stem may be used; but this is an obvious use of an old part and for the sake of clearness in the drawings, an independent screw bolt is shown. However, the operation is the same, whether the ordinary valve stem is used, or an independent screw bolt.

It will thus be seen that in both forms of the invention there is provided a rim for automobile wheels wherein all of the advantages of the so-called deep rim are retained, while at the same time the possibility of the tire coming off of the wheel, due to its beads slipping down into the groove of the deep rim when the tire becomes partially deflated, is eliminated. Furthermore, the construction is such that it may be readily and inexpensively applied either to rims which are already in use, or to new rims.

Having thus described my invention, what I claim and desire to secure by Letters Patent of the United States is:—

1. A deep rim attachment for vehicle wheels, comprising an annulus, substantially trough shaped in cross section, the bottom of which is provided with a medial bead receiving groove, said groove extending through less than half the circumference of the rim, and a radially adjustable safety piece, adapted to be moved into or out of the circumferential central portion of said groove, thereby preventing the tire beads from entering, or permitting the said beads to enter said grooves when the tire is deflated, as desired.

2. A deep rim attachment for vehicle wheels, comprising an annulus, substantially trough shaped in cross section, the bottom of which is provided with a medial bead receiving groove; said groove extending through less than half the circumference of the rim, and a radially adjustable arcuate safety piece having inwardly extending side flanges, adapted to be moved into or out of the circumferential central portion of said groove, thereby preventing the tire beads from entering, or permitting the said beads to enter said grooves when the tire is deflated, as desired.

3. A deep rim attachment for vehicle wheels, comprising an annulus, substantially trough shaped in cross section, the bottom of which is provided with a medial bead receiving groove; said groove extending through less than half the circumference of the rim, a screw bolt passing radially through said rim near the circumferential center of said groove, a nut on said bolt, and a safety piece carried by said screw bolt, and adapted to be moved into or out of said groove, thereby preventing the tire beads from entering, or permitting the said beads to enter said grooves when the tire is deflated, as desired.

4. A deep rim attachment for vehicle wheels, comprising an annulus substantially trough shaped in cross section, the bottom of which is provided with a medial bead receiving groove, said groove extending through less than half the circumference of the rim, a screw bolt passing radially through said rim near the circumferential center of said groove, a nut on said bolt, and a safety piece carried by said screw bolt and having inwardly extending side flanges, adapted to be moved into or out of said groove, thereby preventing the tire beads from entering, or permitting the said beads to enter said grooves when the tire is deflated, as desired.

5. A deep rim attachment for vehicle wheels provided with pneumatic tires, comprising an annulus, substantially trough shaped in cross section, the bottom of which is provided with a medial bead receiving groove; said groove extending through less than half the circumference of the rim, a screw threaded valve stem secured with inner tube and passing radially through said rim near the circumferential center of said groove, a nut on said valve stem, and a safety piece carried by said valve stem, and adapted to be moved into or out of said groove, thereby preventing the tire beads from entering, or permitting the said beads to enter said grooves when the tire is deflated, as desired.

6. A deep rim attachment for vehicle wheels provided with pneumatic tires, comprising an annulus substantially trough shaped in cross section, the bottom of which is provided with a medial bead receiving groove, said groove extending through less than half the circumference of the rim, a screw threaded valve stem secured to the inner tube and passing radially through said rim near the circumferential center of said groove, a nut on said valve stem, and a safety piece carried by said valve stem, and having inwardly extending side flanges, adapted to be moved into or out of said groove, thereby preventing the tire beads from entering, or permitting the said beads to enter said grooves when the tire is deflated, as desired.

ANDRÉ JULES MICHELIN.